March 12, 1940.  W. F. BANNISTER  2,193,186
TWIST DRILL
Filed June 6, 1938
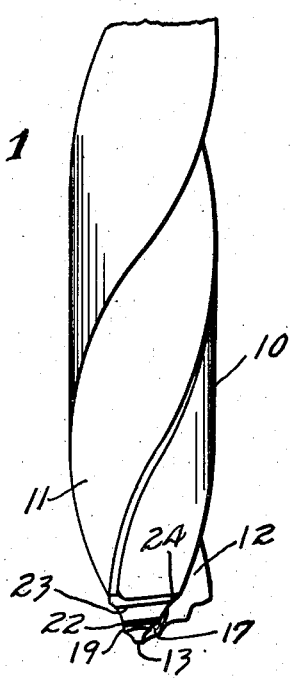
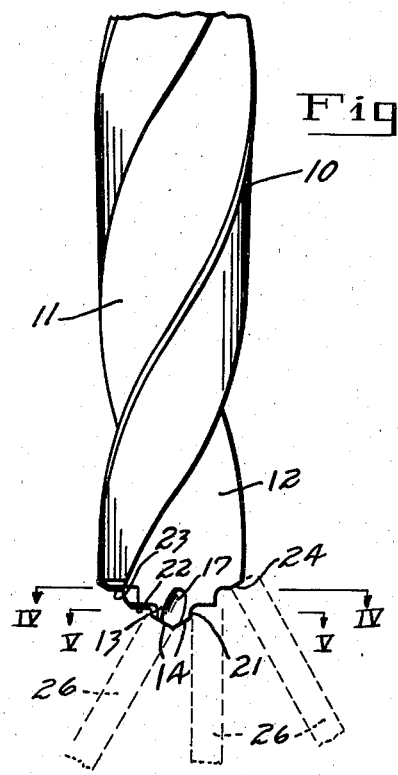
Inventor
WALTER F. BANNISTER
By Johnston & Jennings
Attorneys Patented Mar. 12, 1940

2,193,186

UNITED STATES PATENT OFFICE 2,193,186

TWIST DRILL

Walter F. Bannister, Birmingham, Ala., assignor of forty-nine per cent to Herbert G. Hard, Birmingham, Ala.

Application June 6, 1938, Serial No. 212,032

5 Claims. (Cl. 77—70)

My invention relates to metal working twist drills, and has for some of its objects the provision of such a drill which shall be operable with much less power than twist drills as heretofore formed; which shall generate less heat in cutting; which shall be effective to drill a round hole; which shall be readily started into the material to be drilled; which shall be effective to drill large holes in one operation; and which shall be effective to clear the hole being drilled of chips as they are formed.

A still further object of my invention is to provide a twist drill which shall present a series of drilling units to the work, the first or smallest unit having a central core of minimum area whereby to reduce to a minimum the metal to be crushed during the drilling operation.

A further object of my invention is to provide a method of grinding a twist drill whereby the foregoing objects may be obtained.

It is well known in the art to which my invention relates that the most difficult of all mechanical operations is the boring of a correct hole. A number of independent requirements must be met simultaneously. These requirements are (a) the center of the hole must be located in the correct position; (b) the axis of the hole must be a straight line; (c) the axis of the hole must run in the proper direction, so that the end, as well as the beginning of the hole, shall be in the proper location; (d) the hole must be round; (e) the section of the hole must be uniform; and (f) the hole must be of correct size. (DeLeeuw, "Metal Cutting Tools," page 56.)

Inasmuch as the cutting edges of a twist drill have very little strength in themselves, they must depend for their strength on the central core of the drill. The connecting bridge or core of such a drill as heretofore ground must be heavier for a large drill than it is for a small one. As the amount of work done by the drill varies with the area of the hole being drilled or as the square of the diameter, it follows that the area of the central core must also vary as the square of the diameter. Inasmuch as the central core can do no cutting, but must crush the metal ahead of it, it also follows that the pressures required for crushing the metal of the central core of large drills, say above one inch in diameter, become very large. It has been found, for example, that in order to make a 26 inch drill penetrate into a solid steel forging, a feed pressure of 300,000 pounds was required. ("Metal Cutting Tools," DeLeeuw, 1922, page 61.)

In order to avoid heavy feed pressures, it has heretofore been the custom, where large holes were to be drilled, to drill a relatively small hole first and then follow with a larger drill. For example, if a two-inch hole was to be drilled, a ¾ inch hole was first drilled and this followed by a two-inch drill. This method, besides entailing two operations with two drill set-ups, has the disadvantage of increasing the difficulty of centering the larger hole and there being nothing to hold the large drill centered, it increases the difficulty of drilling the hole round.

Due to the large central core of a twist drill, as heretofore ground, it has been difficult with large size drills to start the drill centrally of the hole to be bored. Then again, the large central core tends to cause the drill to shift its position so that even if the hole is properly started, the drill, instead of continuing in an axial course, shifts about its axis and cuts holes which are more or less out of round. In starting a hole with an ordinary twist drill of large diameter, a circle is usually scribed on the work and punch marks made in the circle at points where the diameters at right angles to each other intersect the circumference. A punch mark is also made in the center of the circle. An attempt is then made to start the drill centrally of the center punch mark. If the drill is found to have shifted away from the center, it is raised and a hand tool is employed to gouge out the metal, whereby the drill may be started into the work centrally of the hole to be drilled.

In accordance with my invention, I provide a drill in which the beforementioned difficulties are overcome. I grind the drill so that the point presents a series of drilling units. The first unit correspoids to a drill of relatively small diameter, say ⅜ inch, having a central core of minimum area which may readily be entered into the ordinary center punch mark of the metal to be drilled, and which therefore maintains its proper starting position. The hole is thus centered to start and there is no necessity of raising the drill and employing a hand tool to center it. Neither is there any necessity for first drilling a small hole and then changing to a larger size drill to drill the larger hole. The first drill unit, and each succeeding drill unit, acts as a guide for the following drill unit so that the drill runs true and drills a straight round hole. The first drilling unit of my improved twist drill is provided with auxiliary flutes that open into and merge with the main flutes of the twist drill, which main flutes are formed as heretofore common in the prior art. The chips from the small drill unit are carried up the auxiliary flutes into the main flutes and thence off with the chips from the other drill units. The auxiliary flutes gradually decrease in depth from the point toward the main body of the drill, so that the central core is wedge shaped in cross section near the point, and the grinding of the auxiliary flutes does not weaken the drill. The cutting edges for the intermediate drill units are preferably substantially normal to the axis of the drill and accordingly will produce short chips. The first, or small drill unit and the outer or largest drill unit are preferably ground to a bevelled or conical cutting edge whereby, when drilling soft metals, such as soft steel, copper and the like, long spiral chips are produced. These long spiral chips thus formed take with them the short chips formed by the cutting edges which are substantially normal to the axis of the drill and thus rid the hole of the short chips which might otherwise clog it.

In grinding a twist drill in accordance with my invention, the first or smallest drill unit is of substantially the same diameter for all diameter drills, so that there is a minimum of metal to be crushed by the central core in the drilling operation, regardless of the size of the hole being drilled, and it is the same amount for all size holes. The power requirement for drilling large holes is thus reduced to the amount required for driving the cutting edges through the metal and the amount heretofore required for crushing the large central cores is eliminated.

Apparatus embodying features of my invention is illustrated in the accompanying drawing forming a part of this application, in which Fig. 1 is a view in elevation of a drill made in accordance with my invention;

Fig. 2 is a view at right angles to Fig. 1, and showing in dotted lines the grinding tool approach in grinding the drill;

Fig. 3 is a bottom plan view of the drill;

Fig. 4 is an enlarged sectional view taken along the line IV—IV of Fig. 2;

Fig. 5 is an enlarged sectional view taken along the line V—V of Fig. 2.

Referring to the drawing for a better understanding of my invention, I show an ordinary twist drill 10 provided with opposed flutes 11 and 12. Instead of grinding the drill with a continuous bevelled or conical point, I form it with a central drilling unit 13 having bevelled cutting edges 14, and provided with auxiliary flutes 17 and 18 which merge into the main flutes 11 and 12. The auxiliary flutes 17 and 18 gradually decrease in depth from the point toward the main body of the drill, whereby the central core is wedge shaped in cross section. I thus avoid weakening the drill, as would be the case if such auxiliary flutes were formed on an ordinary twist drill without forming the small diameter central unit. In drilling, chips formed by the cutting edges 14 are carried into the main flutes 11 and 12 by the auxiliary flutes 17 and 18. The sides 19 and 21 of the drilling unit 13 are made vertical, and are ground without radial clearance, whereby they have a snug bearing with the walls of the hole at all times, which holds the drill steady and insures a round hole. The central unit is so short that the absence of radial clearance does not cause the unit to bind and heat is not generated due to the absence of radial clearance.

The drill is next ground, preferably as shown in Figs. 1 to 3, with a series, or plurality of steps, of cutting edges 22 and 23 which are normal to the axis of the main drill 10, and the plane of the surface behind each edge is inclined to the axis of the drill, as shown in Fig. 1, in order to provide axial clearance for the drill so that it will feed at the desired rate of speed. The last cutting edge 24 of the drill, shown in Figs. 1 and 2, is preferably bevelled.

As is well known, bevelled cutting edges, in drilling soft metal, such as copper or soft steel, produce long chips, whereas cutting edges normal to the axis of the drill produce short chips, and the short chips are liable to jamb the drill in the hole and cause it to break off. By providing the bevelled cutting edges 14 on the central drilling unit 13, and the bevelled cutting edges 24 on the outer drill unit, I am enabled to produce long chips along with the short ones, which long chips entangle with the short ones and carry them out of the hole being drilled.

In Fig. 2 I show in dotted lines the angles at which the drill is held with respect to a grinding wheel 26 to produce the cutting edges hereinbefore described. In order that accuracy of grinding be accomplished, it is recommended that a drill grinding machine be employed.

The auxiliary flutes 17 and 18 are ground after the cutting edges 22 and 23 are ground, as heretofore described. As seen in Figs. 3 and 5, the provision of the auxiliary flutes reduces the central core area at the point to where it is negligible, so that the amount of metal to be crushed in drilling is reduced to a minimum and the feeding pressure for the drill is greatly reduced. I have found, in actual tests with a one inch drill, that the feeding pressure required, as compared with a standard conical point drill, was reduced more than 42%. It will be apparent that with the central core area of a twist drill, as heretofore ground, increasing with the square of the diameter of the drill, that the feed pressure for larger drills ground in accordance with my invention would be decreased more. I have also found that the power required to drive a one inch drill made in accordance with my invention, at the same speed and drilling the same material as a standard conical point one inch drill, is less. There being less crushing of the material, there is less heat generated, and a drill made in accordance with my invention will do much more work without regrinding. The central grinding unit 13 and each succeeding grinding unit formed by the stepped cutting edges, forms a pilot for the succeeding larger drilling unit, so that holes drilled with my improved drill are perfectly round and straight, and of uniform section, thus meeting the requirements heretofore found so difficult with prior art drills.

In grinding my improved drill, as will be seen in Fig. 2, all the series of cutting edges from those of the central pilot unit 13 to the last cutting edge 24 are formed within an angle of approximately 59° to the axis of the drill, or an included angle of 118°, which is considered the most efficient angle in grinding twist drills. See Calvin and Stanley, "Machine Tools and Their Operation," first edition, part II, pages 395, 396; Machinery's Encyclopedia, Vol. II, pages 432 and 433. In this way I do not sacrifice any strength in the point, nor do I lose drilling time which would be the case if the steps were longer.

While I have illustrated a plurality of steps or series of drilling units, the number will be governed largely by the size of the drill. For example, with drills less than one inch in diameter, I preferably grind the point with the central drilling unit and one pair of cutting edges. As the diameter of the drill increases, the number of drill units may be increased.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A metal working twist drill comprising a fluted body, a series of stepped cutting elements formed on one end of said fluted body within an included angle of approximately 118°, and the central of said cutting elements having auxiliary flutes formed therein opening into the main flutes of said fluted body so that chips therefrom are discharged into said main flutes.

2. A metal working twist drill comprising a fluted body, a series of stepped cutting elements formed on one end of said fluted body within an included angle not less than 118°, the central and outermost of said cutting elements having a part of their cutting edges bevelled, the central cutting element having auxiliary flutes formed on its opposed sides opening into the main flutes of said fluted body so that chips therefrom are discharged into said main flutes.

3. In a twist drill having main flutes, a central pilot drill unit ground without radial clearance and having auxiliary flutes opening into and merging with the main flutes, conical cutting edges on the pilot drill unit merging with the auxiliary flutes, succeeding drill units having cutting edges merging with the main flutes, and a final drill unit having conical cutting edges merging with the main flutes, all of said drill units being formed within an included angle of approximately 118°.

4. A twist drill for drilling relatively large diameter holes comprising a plurality of drill units formed within an included angle of approximately 118°, the central smallest unit being ground without radial clearance and having a central core of minimum area wedge shaped in cross section with bevelled cutting edges and with auxiliary flutes opening into and merging with the main flutes of the drill, the intermediate drill units having cutting edges merging with the main flutes and the outer largest unit having bevelled cutting edges merging with the main flutes.

5. In a twist drill having main flutes, a succession of drill units formed within an included angle of approximately 118° each having cutting edges merging into the main flutes except the central smallest unit, said smallest unit being ground with bevelled cutting edges and with auxiliary flutes with which the auxiliary cutting edges merge, which latter flutes open into and merge with the main flutes, said smallest unit being ground without radial clearance.

WALTER F. BANNISTER.